(12) United States Patent
Sato et al.

(10) Patent No.: US 8,268,422 B2
(45) Date of Patent: Sep. 18, 2012

(54) RESIN COATED SEAMLESS CAN

(75) Inventors: Kazuhiro Sato, Yokohama (JP);
Kazuaki Ohashi, Yokohama (JP)

(73) Assignee: Toyo Seikan Kaisha, Ltd., Chiyoda-Ku, Tokyo ( * ) Notice: Subject to any disclaimer, the term of this patent is extended or adjusted under 35 U.S.C. 154(b) by 806 days.

(21) Appl. No.: 12/135,005

(22) Filed: Jun. 6, 2008

(65) Prior Publication Data

US 2008/0241448 A1  Oct. 2, 2008

Related U.S. Application Data

(63) Continuation of application No. 10/178,790, filed on Jun. 25, 2002, now abandoned.

(30) Foreign Application Priority Data

Jun. 25, 2001 (JP) .................................. 2001-192047
Jul. 11, 2001 (JP) .................................. 2001-211430

(51) Int. Cl.
*B32B 1/02* (2006.01)
*B32B 1/08* (2006.01)

(52) U.S. Cl. ..................... 428/35.8; 428/34.1; 428/34.2; 428/35.7; 428/35.9; 428/36.9

(58) Field of Classification Search ................. 428/34.1, 428/34.2, 35.7, 35.9, 35.8, 36.9
See application file for complete search history.

(56) References Cited

U.S. PATENT DOCUMENTS 2,861,022 A * 11/1958 Lundsager ..................... 428/458
5,803,301 A *  9/1998 Sato et al. ................... 220/62.22

FOREIGN PATENT DOCUMENTS

| JP | 09-270489 | 4/1999 |
| JP | 10-196663 | 1/2000 |
| JP | 10-196665 | 1/2000 |

* cited by examiner

*Primary Examiner* — Marc Patterson
(74) *Attorney, Agent, or Firm* — Browdy and Neimark, PLLC

(57) ABSTRACT

A resin-coated seamless can of the present invention is a resin-coated seamless can formed of a resin-coated metal sheet 1 which is produced by coating a polyester resin layer 3 containing polyethylene terephthalate onto a surface of a metal substrate 2, wherein the density of a polyester resin layer of a can inner surface side is set to equal to or more than 1.36 at a can barrel upper portion. Further, an infrared dichroic ratio (R1) of the polyester resin layer at the inner surface side of the can barrel portion which is expressed by a following formula (1) is set to equal to or more than 1.1.

$$R1 = Iw(\perp)/Iw(\parallel) \tag{1}$$

In the formula (1), $Iw(\perp)$ indicates an infrared absorption intensity of 973 $cm^{-1}$ with respect to polarized infrared rays perpendicular to the can height direction at the can barrel portion, and $Iw(\parallel)$ indicates an infrared absorption intensity of 973 $cm^{-1}$ with respect to polarized infrared rays parallel to the can height direction at the can barrel portion.

4 Claims, 2 Drawing Sheets

RESIN COATED SEAMLESS CAN

BACKGROUND OF THE INVENTION

1. Field of the Invention

The present invention relates to a resin-coated seamless can, and more particularly to a resin-coated seamless can which exhibits excellent corrosion resistance and excellent shock resistance.

2. Description of the Related Art

Conventionally, as a side seamless can, there has been known a can which is produced by a following method. That is, a metal blank such as an aluminum plate, a tin plate or a tin-free steel plate is subjected to at least one drawing stage. The drawing stage is conducted between a drawing die and a punch to form a cylindrical cup comprising a barrel portion free of seams on a side surface thereof and a bottom portion integrally connected to the barrel portion which is also free of seams. Then, if desired, the barrel portion may be subjected to ironing between an ironing punch and a die to reduce the thickness of the barrel portion (drawing/ironing working).

Further, in place of such ironing, it is also known in the art to reduce the thickness of the side wall by performing thinning drawing forming which reduces the thickness of the side wall by bending and elongating the side wall at a curvature corner part of a redrawing die (drawing/thinning drawing forming).

Further, there has been also known thinning drawing forming and ironing working which reduces the thickness of the side wall portion by adding ironing working at the time of performing thinning drawing working (drawing/thinning drawing forming and ironing working).

Methods for coating an organic resin film onto the side seamless can include a method of applying an organic coating onto a formed can which is a common and widely used technique and, in addition, a method of laminating a resin film onto a metal blank before a can is formed. Further, in the production of a can by thinning drawing forming, the use of a metal sheet coated with polyester, vinyl organosol, epoxy, phenolic or acryl has been known in the art.

A considerable number of proposals have been made concerning a method for coating a thermoplastic resin film typically made of thermoplastic polyester onto a metal substrate. For example, there have been adopted a method which laminates a biaxially stretched film onto a metal substrate using heat-bonding directly or by way of a primer layer for adhesion (for example, Japanese Laid-open Patent Publication 101930/1991, Japanese Laid-open Patent Publication 4229/1993, Japanese Laid-open Patent Publication 172556/1994) and a method which extrudes molten resin and coats the molten resin onto a metal substrate (Japanese Laid-open Patent Publication 86308/1998).

With respect to the seamless can which is formed by drawing/ironing working, drawing/thinning drawing forming or drawing/thinning drawing forming and ironing working (hereinafter, these working methods being referred to as "drawing/thinning drawing forming and/or ironing working"), the demand for the enhancement of degree of working has been increasing year by year. Accordingly, it has been difficult for a resin-coated metal sheet for can use which has been conventionally adopted and is formed by laminating a biaxially stretched film on a metal sheet by heat adhesion to catch up with the harsh demand for working which becomes stricter year by year.

To the contrary, with respect to the resin-coated metal sheet for can use which is produced by extruding and coating molten resin on a metal substrate or by laminating a cast film to the metal substrate, since the resin is held in the non-oriented state, the tolerance for endurance against the above-mentioned harsh working is large. Due to such a reason, the resin-coated metal sheet for can use which is produced by extruding and coating molten resin on a metal substrate or by laminating a cast film to the metal substrate has been recently used.

The thermoplastic resin-coated metal sheet which is produced by extruding molten resin onto the metal substrate or by laminating the cast film to the metal substrate is formed into a cylindrical cup by drawing forming. Thereafter, a seamless can which has a large height and can reduce a thickness of a side wall thereof is formed by thinning drawing forming and/or ironing working. Such a seamless can largely differs between a can bottom portion and a can barrel portion with respect to the state of an adhesive interface formed between a coated resin layer and the metal substrate.

That is, with respect to the can bottom portion, since the degree of working is not strict, the adhesive interface substantially remains unchanged in a form of the original resin-coated metal sheet before working, while with respect to the can barrel portion, since the degree of working is strict, an internal stress at the adhesive interface derived from the working of the coated resin layer is increased, whereby there has been a case that the occurrence of peeling-off or cracks at the adhesive interface is recognized. Accordingly, irrespective of the presence or the absence of a surface treatment layer on a surface of the metal substrate, the corrosion resistance and the shock resistance when the resin-coated metal sheet is formed into a seamless can are degraded.

With respect to corrosion resistance of the seamless can formed of the thermoplastic resin-coated metal sheet, corrosion under a film which is referred to as an under film corrosion (UFC) in general is liable to progress. This corrosion is a phenomenon that although there seems to be no problem in terms of protection with respect to a film layer which covers a metal substrate in appearance, the metal substrate underneath the film layer is subjected to corrosion. The resin-coated metal sheet is requested to prevent such a corrosion.

As one of shock resistances, there exists dent resistance which is measured when the resin-coated metal sheet is formed into an actual canned product. This dent resistance is the property which the resin-coated metal sheet is required to have. That is, the dent resistance is the property which ensures the resin-coated metal sheet to completely maintain the adhesiveness of the film and the protection even when an indentation called a dent is formed in the canned product due to a fall of the canned product or a collision of canned products.

Accordingly, it is an object of the present invention to provide a resin-coated seamless can which is formed of a resin-coated metal sheet produced by coating thermoplastic resin on a surface of a metal substrate and exhibits the excellent corrosion resistance and the excellent shock resistance.

SUMMARY OF THE INVENTION

The present invention is directed to a resin-coated seamless can formed of a resin-coated metal sheet which is produced by coating a polyester resin layer containing polyethylene terephthalate on a surface of a metal substrate, wherein the density of the polyester resin layer at a can inner-surface side is equal to or more than 1.36 at an upper portion of a can barrel portion or a can-barrel upper portion.

Further, with respect to the resin-coated seamless can of the present invention, it is preferable that the density of the polyester resin layer at the can inner surface side is equal to or less than 1.36 at a can bottom portion.

The present invention is also directed to a resin-coated seamless can formed of a resin-coated metal sheet which is produced by coating a polyester resin layer containing polyethylene terephthalate on a surface of a metal substrate, wherein an infrared dichroic ratio (R1) of the polyester resin layer at the inner surface side of the can barrel portion which is expressed by a following formula (1) is set to equal to or more than 1.1.

$$R1 = Iw(\perp)/Iw(\|) \qquad (1)$$

Here, Iw(⊥) is an infrared absorption intensity of 973 cm$^{-1}$ with respect to polarized infrared rays perpendicular to the can height direction at the can barrel portion and Iw(∥) is an infrared absorption intensity of 973 cm$^{-1}$ with respect to polarized infrared rays parallel to the can height direction at the can barrel portion.

In the above-mentioned resin-coated seamless can, an infrared dichroic ratio (R2) of the polyester resin layer at the inner surface side of the can bottom portion expressed by a following formula (2) is set to equal to or less than 1.1.

$$R2=IB(\perp)/IB(\parallel) \qquad (2)$$

wherein, IB(⊥) is an infrared absorption intensity of 973 cm$^{-1}$ with respect to polarized infrared rays perpendicular to the metal substrate rolling direction at the can bottom portion and IB(∥) is an infrared absorption intensity of 973 cm$^{-1}$ with respect to polarized infrared rays parallel to the metal substrate rolling direction at the can bottom portion.

Due to the above-mentioned constitution, it is possible to obtain an advantageous effect that the adhesiveness between a surface treatment layer and a resin layer on a surface of the metal substrate can be enhanced, the corrosion under the film (UFC) of the seamless can be suppressed, and shock resistance (dent resistance) of the film can be enhanced.

Accordingly, it is preferable to produce the resin-coated metal sheet by forming the non-oriented polyester resin layer on the metal substrate.

Further, it is preferable that the resin-coated seamless can of the present invention is formed by drawing/thinning drawing forming and/or ironing working such that a thickness of the can barrel portion becomes 20 to 85% of a thickness of the can bottom portion.

Further, in the resin-coated seamless can of the present invention, the polyester rein layer is constituted of two layers, wherein a surface layer (A) is formed of polyethylene terephthalate/isophthalate containing equal to or less than 15 mol % of isophthalic acid and a lower layer (B) is formed of polyethylene terephthalate/isophthalate containing 8 to 25 mol % of isophthalic acid.

Further, in the resin-coated seamless can of the present invention, it is preferable that the intrinsic viscosity of the polyester resin is set to equal to or more than 0.6 dl/g.

Still further, in the resin-coated seamless can of the present invention, it is preferable that the degree of crystallization due to a density method of the polyester resin layer at an upper portion of the can barrel portion falls in a range of 20 to 55%.

DETAILED DESCRIPTION OF THE PREFERRED EMBODIMENTS

Preferred embodiments of the present invention are explained in conjunction with attached drawings.

[Resin-Coated Seamless Can]

A resin-coated seamless can according to the present invention is formed by making a resin-coated metal sheet which is formed by coating a polyester resin layer containing polyethylene terephthalate onto a surface of a metal substrate subjected to drawing/thinning drawing forming and/or ironing working.

The resin-coated seamless can according to the present invention is formed such that the above-mentioned polyester resin-coated metal sheet is drawn into a bottomed cup using a drawing die and a punch and, thereafter, the cup-shaped metal sheet is subjected to thinning drawing forming by bending and elongation and/or ironing working.

Due to the above-mentioned thinning drawing forming and/or ironing working, a thickness of a side-wall portion of a cup is reduced and the resin-coated layer of a can barrel portion of the formed seamless can has molecules thereof oriented at least in the uniaxial direction.

Figure 1:
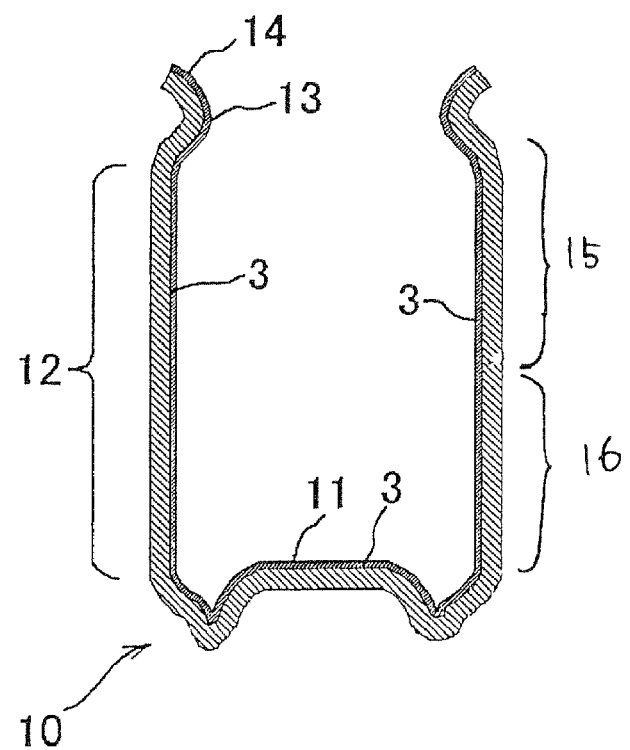
FIG. 1 is a schematic view showing a resin-coated seamless can according to the present invention.

FIG. 1 is a schematic view showing one embodiment of the resin-coated seamless can according to the present invention. In FIG. 1, a resin-coated seamless can 10 is formed by making the resin-coated metal sheet 1 subjected to the drawing/thinning drawing forming and/or ironing working and is constituted of a can bottom portion 11 and a can barrel portion 12. The can barrel portion 12 includes a straight portion consisting of two halves defined in the vertical direction, wherein an upper half of the straight portion constitutes a can-barrel upper portion 15 and a lower half constitutes a can-barrel lower portion 16.

On an upper end of the can barrel portion 12, a neck portion 13 is formed when necessary. Further, a flange portion 14 is formed on the upper end of the can barrel portion 12 by way of the neck portion 13.

In the resin-coated seamless can 10 formed in the above-mentioned manner, a polyester resin layer 3 of the can barrel portion 12 is held in the state that molecules thereof are oriented at least in the uniaxial direction, while the polyester resin layer 3 of the can bottom portion 11 is held in the state that molecules are oriented in no direction.

Further, in the resin-coated seamless can 10 according to the present invention which is formed in the above-mentioned manner, the degree of working of the can barrel upper portion 15 at the time of forming the can is relatively high compared to that of the can-barrel lower portion 16 so that it is considered that defects of the coated resin is more liable to be generated in the can-barrel upper portion 15. Accordingly, it is considered that by controlling the characteristic of the resin-coated seamless can at least at the can-barrel upper portion 15, the stability of the quality of the whole can can be ensured.

Here, the resin-coated seamless can 10 according to the present invention may be produced by coating the polyester resin layers 3 on both surfaces of the metal substrate 2. In this case, the resin-coated metal sheet 1 having the cross-sectional structure shown in FIG. 2 in which the polyester resin layers 3, 4 are coated on both surfaces of the metal substrate 2 is formed by drawing/thinning drawing forming and/or ironing working. Further, the resin-coated seamless can 10 according to the present invention may have the cross-sectional structure shown in FIG. 3, wherein an inner surface layer 5 is formed as an upper layer of the inner-surface polyester resin layer 3. Such an inner surface layer 5 is formed on an inner surface side of the resin-coated seamless can 10. The inner surface layer 5 is preferably formed of resin which exhibits a poor absorption property for fragrance components in the inside of a content, for example.

[Polyester Resin Layer]

The resin-coated seamless can 10 according to the present invention is characterized in that the density of the polyester resin layer 3 at the inner surface side in the can barrel portion 12 is set to equal to or more than 1.36 at the can-barrel upper portion.

When the density is less than 1.36, the corrosion under film is liable to be generated when an acid content is filled in the formed seamless can. Further, the adhesiveness of the polyester resin layer with the metal substrate and the dent resistance of the polyester resin layer are degraded. Accordingly, such a density is not desirable.

That is, to explain this point in more detail, the density of the polyester resin layer at the inner-surface side of the can barrel portion indicates the degree of crystallization. The resin-coated seamless can according to the present invention is characterized in that the density of the polyester resin layer containing polyethylene terephthalate at the inner surface of the can barrel portion is maintained at a value equal to or more than 1.36 and the molecules are oriented at the can-barrel upper portion.

Further, the resin-coated seamless can 10 according to the present invention is characterized in that an infrared dichroic ratio (R1) of the inner surface side polyester resin layer 3 at the can barrel portion 12 is set to equal to or more than 1.1.

When the infrared dichroic ratio (R1) is less than 1.1, corrosion under film is liable to be generated when an acid content is filled in the formed seamless can. Further, adhesiveness of the polyester resin layer with the metal substrate and dent resistance are also degraded. Accordingly, such a dichroic ratio is not desirable.

That is, to explain this point further, the infrared dichroic ratio (R1) of the polyester resin layer at the inner surface side of the can barrel portion which is expressed by a following formula (1) indicates a ratio between an infrared absorption intensity Iw ($\perp$) of 973 $cm^{-1}$ of the polyester resin layer at the inner surface side of the can barrel portion with respect to polarized infrared rays perpendicular to the can height direction and an infrared absorption intensity Iw($\parallel$) of 973 $cm^{-1}$ of the polyester resin layer at the inner surface side of the can barrel portion with respect to polarized infrared rays parallel to the can height direction.

$$R1 = Iw(\perp)/Iw(\parallel) \quad (1)$$

The resin-coated seamless can according to the present invention is characterized in that in the polyester resin layer containing polyethylene terephthalate formed on the inner surface of the can barrel portion, the ratio (R1) between the infrared absorption intensity Iw($\perp$) of 973 $cm^{-1}$ of the polyester resin layer at the inner surface side of the can barrel portion with respect to polarized infrared rays perpendicular to the can height direction and the infrared absorption intensity Iw($\parallel$) of 973 $cm^{-1}$ of the polyester resin layer at the can barrel portion with respect to polarized infrared rays parallel to the can height direction is set to equal to or more than 1.1 and molecules thereof are subjected to orientation.

In this manner, by making the above-mentioned polyester resin layer subjected to the molecular orientation to some extent in the can height direction by performing drawing/thinning forming and/or ironing working and making the polyester resin layer subjected to the orientation crystallization by heat treatment, factors which impede adhesiveness such as an internal stress and the like on an adhesive interface formed between a surface of the metal substrate and the polyester resin layer which are caused by working of the polyester resin layer can be removed whereby corrosion resistance, shock resistance and the like can be enhanced.

That is, it is possible to obtain advantageous effects that adhesiveness on an adhesive interface formed between the coated resin layer and the surface of the metal substrate is enhanced, corrosion under film (UFC) of the seamless can is suppressed, and shock resistance (dent resistance) of the film is enhanced.

Further, it is also possible to obtain an advantageous effect that even when the seamless can is stored in a form of a canned product, an absorption of a flavor of a content by resin is prevented or when the canned product is opened to be served for drinking or eating, the change of taste is prevented.

Still further, in the resin-coated seamless can according to the present invention, it is preferable that the density of the polyester resin layer at the inner surface side of the can bottom portion or the inner surface side of the can bottomed portion and the inner surface side of the can-barrel lower portion is set to equal to or less than 1.36.

In the resin-coated seamless can according to the present invention, the orientation state of the resin-coated layer at the can bottom portion shows the orientation state of the resin-coated layer before working. Accordingly, to enable the resin-coated layer at the can bottom portion to follow the severe working of the can barrel portion, it is necessary to maintain the orientation state of the coated resin layer at the can bottom portion substantially in the non-oriented state. Further, it is possible to maintain corrosion resistance, shock resistance and the like in the satisfying state by sufficiently ensuring adhesiveness on the adhesive interface formed between the resin-coated layer and the surface of the metal substrate at the can bottom portion.

The endowment of the above-mentioned characteristics on density of the resin-coated seamless can be conducted in view of the orientation state of the coated polyester resin before working, the forming condition of the seamless can, the heat treatment after forming the seamless can and the like.

To control the density of the resin-coated seamless can, it is necessary to perform following steps. That is, the substantially non-oriented polyester resin-coated metal sheet which is produced by extruding and coating molten resin on a surface of a metal sheet or laminating a cast film on the surface of the metal sheet is used. The resin-coated metal sheet is formed into a seamless cap by thinning drawing forming and/or ironing working under an appropriate temperature condition. Thereafter, the seamless cap is subjected to the heat treatment so that a strain (a residual stress) of the coated resin layer of the can barrel portion which is caused by working is alleviated and the molecules are orientated and crystallized.

Further, in the resin-coated seamless can according to the present invention, it is preferable that the coated resin layer of the can bottom portion is in the non-oriented state. It is also preferable that with respect to the polyester resin layer on the inner surface of the can bottom portion which contains polyethylene terephthalate, a ratio (R2) between an infrared absorption intensity IB($\perp$) of 973 $cm^{-1}$ with respect to polarized infrared rays perpendicular to the metal substrate rolling direction at the can bottom portion and an infrared absorption intensity IB($\parallel$) of 973 $cm^{-1}$ with respect to polarized infrared rays parallel to the metal substrate rolling direction at the can bottom portion is set to equal to or less than 1.1.

In the can bottom portion, since the working is not severe, the orientation state of the coated resin layer is maintained so that the orientation state of the can bottom portion indicates the orientation state of the coated resin layer before working. To make the can bottom portion follow the severe working of the can barrel portion, it is necessary to set the orientation state of the coated resin layer before working in the non-oriented state. To obtain the resin-coated seamless can which is subjected to the sophisticated working, it is dispensable that with respect to the orientation of the can bottom portion which shows the orientation state of the coated resin layer before working, the above-mentioned dichroic ratio R2 is set to equal to or less than 1.1 which shows that the coated resin layer is substantially in the non-oriented state.

Further, in the can bottom portion, the adhesive interface between the coated resin layer and the surface of the metal substrate is substantially maintained in a form of the resin-coated metal sheet before working and hence, the adhesiveness between them is sufficient and the can bottom portion is maintained in the state which satisfies the corrosion resistance and the shock resistance.

The endowment of the above-mentioned characteristics on the infrared dichroic ratios (R1) and (R2) of the resin-coated seamless can be conducted in view of the orientation state of the coated polyester resin before working, the forming condition of the seamless can, the heat treatment after forming the seamless can and the like.

To control the infrared dichroic ratios (R1) and (R2) of the resin-coated seamless can, it is necessary to perform following steps. That is, the substantially non-oriented polyester resin-coated metal sheet which is produced by extruding and coating molten resin on a surface of a metal sheet or laminating a cast film on the surface of the metal sheet is used. The resin-coated metal sheet is formed into a seamless cap by thinning drawing forming and/or ironing working under the appropriate temperature condition. Thereafter, the seamless cap is subjected to the heat treatment so that the strain (the residual stress) of the coated resin layer of the can barrel portion which is caused by working is alleviated and the molecular orientation is thermally fixed.

It is preferable to perform the heat treatment in general at a temperature of Tg+50 degree centigrade with respect to a glass transition point (Tg) of the resin-coated layer. It is particularly preferable to perform the heat treatment in a temperature range of Tg+100 to a melting point (Tm)−5 degree centigrade. This is because that when the temperature of the heat treatment is at a temperature side lower than the above-mentioned temperature range, there arises a problem that the alleviation of strain of the coated polyester resin layer becomes insufficient and there is a possibility that the post workability is degraded. On the other hand, when the temperature of the heat treatment is at a temperature side higher than the above-mentioned temperature range, there arises a problem that the tendency that the molecular orientation formed at the time of forming the can is increased so that corrosion resistance of the can barrel portion is degraded.

Due to such heat treatment, the heat resistance of the coated polyester resin layer is enhanced and the adhesiveness of the coated polyester resin layer to the metal substrate is also enhanced. Further, workability which influences post workings such as neck-in working, flange working and the like or flavor resistance can be enhanced.

Further, with respect to the can bottom portion, since the degree of working of the can bottom portion is low, due to the above-mentioned heat treatment which is performed subsequently, the density of the resin-coated seamless can at the inner surface side of the can bottom portion or the inner surface side of the can bottom portion and the inner surface side of the can-barrel lower portion can be maintained at a value equal to or below 1.36.

Here, when the resin-coated layer is of a multiple layer consisting of two or more layers, it is preferable to perform the heat treatment such that the temperature of the lowermost resin-coated layer falls in the above-mentioned temperature range.

Further, although the crystallization of polyester resin is roughly classified into the thermal crystallization and the orientation crystallization, the polyester resin layer of the resin-coated seamless can according to the present invention is characterized by mainly having the latter crystallization characteristics.

That is, the polyester resin layer of the can-barrel upper portion is highly subjected to the orientation crystallization at the time of forming the seamless can and, due to the heat treatment performed thereafter, it is possible to impart the excellent characteristics with respect to heat resistance, shock resistance and corrosion resistance without giving rise to coarse lamella-type crystals.

The above-mentioned heat treatment manipulation is performed before or after performing trimming which cuts 1 ug portions of can which are produced at the time of forming the seamless can.

Although the necessary heat treatment time differs also depending on the degree of molecular orientation formed in the coated polyester resin layer of the can barrel portion at the time of forming the can, the heat treatment time is short in general and it is preferable to perform the heat treatment within 1 to 10 minutes.

Here, according to the present invention, after the heat treatment, the seamless can may be gradually cooled or quenched.

While the can barrel portion 12 at the can-inner-surface side of the resin-coated seamless can according to the present invention is subjected to the molecular orientation by working, since the level of working is not severe with respect to the can bottom portion 11, the coated resin layer of the can bottom portion is held at the non-oriented state so that the adhesive interface thereof with the metal substrate 2 substantially remains unchanged.

As a result, it is possible to obtain advantageous effects that even when a surface treatment layer on the surface of the metal substrate is cracked, the adhesiveness with the polyester resin layer is enhanced, the corrosion under film (UFC) of the seamless can is suppressed, and the shock resistance (dent resistance) of the film is enhanced.

The thickness of the resin-coated seamless can 10 according to the present invention is preferably reduced by the drawing forming and subsequent thinning drawing forming and/or ironing working due to bending and elongation such that the thickness of the can barrel portion 12 becomes 20 to 85% of, preferably 40 to 80% of the thickness of the can bottom portion 11.

This is because that when the thickness of the can barrel portion 12 becomes less than 20% of the thickness of the can bottom portion 11, it is considered impossible to impart the sufficient molecular orientation to the polyester resin layer on the inner surface of the can barrel portion 12 and when the thickness of the can barrel portion 12 exceeds 85% of the thickness of the can bottom portion 11, it is substantially impossible to realize the thinning of the resin-coated seamless can 10.

To polyester resin layer 3 of the can barrel portion 12 of the resin-coated seamless can 10 according to the present invention which is formed by drawing/thinning drawing forming and/or ironing working, two types of molecular orientations are provided.

The first molecular orientation makes the molecules of polyester resin oriented in the can axis (can height) direction along with the plastic flow at the time of performing drawing/thinning drawing forming and/or ironing working. This molecular orientation is similar to the fiber orientation.

The second molecular orientation is intrinsic to the ironing and, as described in Japanese Patent publication 2970459, the benzene ring surfaces of the polyester molecules are oriented in the state substantially parallel to the film surface.

Both these molecular orientations contribute to the enhancement of the various characteristics of the resin-coated seamless can, particularly, the dent resistance and the corrosion resistance.

According to the present invention, it is preferable to perform the heat treatment to give rise to an advantageous effect that the internal stress which remains in the resin-coated seamless can due to the working can be suppressed.

Then, polyester resin used for producing the resin-coated seamless can according to the present invention should have the molecular weight sufficient to form a thin film layer on the metal substrate and it is preferable to use the polyester resin whose intrinsic viscosity (IV) is equal to or more than 0.6 dl/g, and more particularly in a range of 0.65 to 1.4 dl/g.

When the intrinsic viscosity (IV) is less than 0.6 dl/g, the polyester resin fails to have the heat resistance which can withstand various heat treatments, the formability to the seamless can and the workability to withstand the post working which will be performed after the forming operation. Further, the polyester resin whose intrinsic viscosity (IV) does not fall in the above-mentioned numerical value range cannot have the sufficient mechanical strength and exhibits insufficient barrier property to a corrosive component, and insufficient physical property to a canned content.

Further, since the polyester resin whose intrinsic viscosity (IV) falls in the above-mentioned numerical value range has a large molecular weight, the half-crystallization period (τ) is long so that such polyester resin is also useful from a viewpoint of prevention of the thermal crystallization.

According to the present invention, to orient and crystallize the polyester resin layer at the can barrel portion, it is preferable to use resin whose molecules can be oriented as the polyester resin and to perform the working applied to the seamless can such that the orientation in at least one direction remains in the resin layer in the can barrel portion.

Accordingly, as the polyester resin layer laminated to the can inner surface side of the metal substrate, it is preferable to use polyethylene terephthalate or polybutylene terephthalate.

It is also preferable to use homogenous polyester such as polyethylene terephthalate.

However, it is preferable to lower the maximum degree of crystallization which the polyester resin layer can obtain from a viewpoint of the prevention of thermal crystallization and the enhancement of the shock resistance and the workability.

Accordingly, it is preferable to introduce copolymer ester units other than ethylene terephthalate in the raw material polyester.

The introduction of such copolymer ester units can be obtained by the copolymerization.

Further, the prevention of the thermal crystallization and the enhancement of the shock resistance and the workability of the polyester resin layer can be also achieved by polymer blending or multi-layered lamination.

The copolymer polyester has a tendency to attenuate the uniaxial orientation which is generated at the time of forming the polyester resin layer onto the seamless can compared to homogeneous polyester.

The polyester resin layer used in the present invention may be formed of a multi-layered resin layer, wherein it is preferable that a surface layer (A) is formed of polyethylene terephthalate/isophthalate containing equal to or less than 15 mol % of isophthalic acid and a lower layer (B) is formed of polyethylene terephthalate/isophthalate containing 8 to 25 mol % of isophthalic acid.

Due to the provision of such two-layered resin layer, it is possible to impart adhesiveness with the metal substrate, high workability, corrosion resistance, shock resistance, flavor absorption resistance and the like to the polyester resin layer.

Further, with respect to the resin-coated seamless can according to the present invention, it is preferable that the degree of crystallization of the polymer resin layer at the can barrel upper portion by the density method falls in a range of 20 to 55%.

This is because that when the degree of crystallization is below 20%, there exists the tendency that the adhesiveness with the metal substrate, the corrosion resistance and the shock resistance are degraded and an absorption amount of a flavor component of a content is liable to be increased and hence, such value is not suitable for the seamless can.

On the other hand, when the degree of crystallization exceeds 55%, the adhesiveness with the metal substrate is degraded and the possibility that cracks occur in the polyester resin layer at the time of working is increased.

The degree of crystallization (Xc) by the density method can be generally expressed by a following formula (3).

$$Xc=[dc(d-da)]/[d(dc-da)]\times 100 \quad (3)$$

Here, dc indicates the density of a complete crystallized layer ($=1.455$ g/cm$^3$), da indicates the density of a complete amorphous layer=1.335 g/cm$^3$, and d indicates the density of a test piece (g/cm$^3$).

Resin blending agents which are known per se such as an antioxidant such as steric hindrance type phenol groups, an anti-block agent such as amorphous silica or the like, pigment such as titanium oxide (titanium white), various types of antistatic agents, a lubricant and the like can be blended into the polyester resin layer in accordance with known prescriptions.

[Resin-Coated Metal Sheet]

Subsequently, the resin-coated metal sheet served for producing the resin-coated seamless can according to the present invention is explained in conjunction with FIG. 1 to FIG. 3.

The resin-coated metal sheet 1 served for producing the resin-coated seamless can 10 according to the present invention is produced by laminating the non-oriented polyester resin layer 3 to the metal substrate 2.

The reason that the non-oriented polyester resin layer is used is that the resin-coated metal sheet can be produced with small number of steps and at a low cost by using a molten resin extrusion coating method or a stretched film (cast film) laminating method.

Another reason is that since the polyester resin layer 3 formed on the resin-coated metal sheet 1 is in the non-oriented state, the resin-coated metal sheet 1 exhibits the excellent property in the drawing/thinning drawing forming and/or ironing working so that the thickness of the can barrel portion 12 can be extremely reduced. Still another reason is that the height of the seamless can 10 can be easily increased.

Further, the reason that the resin-coated metal sheet 1 does not use a biaxially stretched film which has been conventionally used for manufacturing cans is that the working of the biaxially stretched film is difficult and pushes up a cost.

The resin-coated metal sheet 1 which is served for the present invention is produced by thermally bonding the polyester resin layer 3 which can orient molecules thereof in the non-stretched state to the metal substrate 2.

That is, to set the density of the polyester resin layer 3 at the can inner-surface side of the seamless can 10 to a value equal to or more than 1.36 and to set the density of the polyester resin layer 3 at the inner surface side of can bottom portion of the seamless can 10 or at the inner surfaces side of can bottom portion and the inner surface side of the can barrel lower portion of the seamless can 10 to a value equal to or less than 1.36, t is important to laminate the polyester resin layer 3 in the substantially non-oriented state.

Hereinafter, the metal substrate 2, the polyester resin layer 3 and the resin-coated metal sheet 1 which are served for the present invention are explained.

Figure 2:
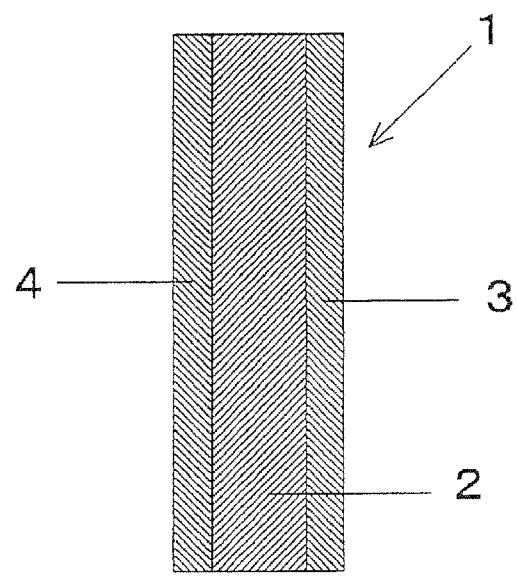
FIG. 2 is a schematic cross-sectional view of a resin-coated metal sheet used in the present invention.

In FIG. 2 which shows one example of the cross-sectional structure of the resin-coated metal sheet 1 served for the present invention, the resin-coated metal sheet 1 is comprised of the metal substrate 2 and the polyester resin layer 3 which is positioned at least at the can inner-surface side.

Further, it is also preferable to form the outer surface film 4 on the resin-coated metal sheet 1, wherein the outer surface film 4 may be formed of material similar to that of the polyester resin layer 3 or may be formed of an ordinary paint for can use or an ordinary resin film.

Figure 3:
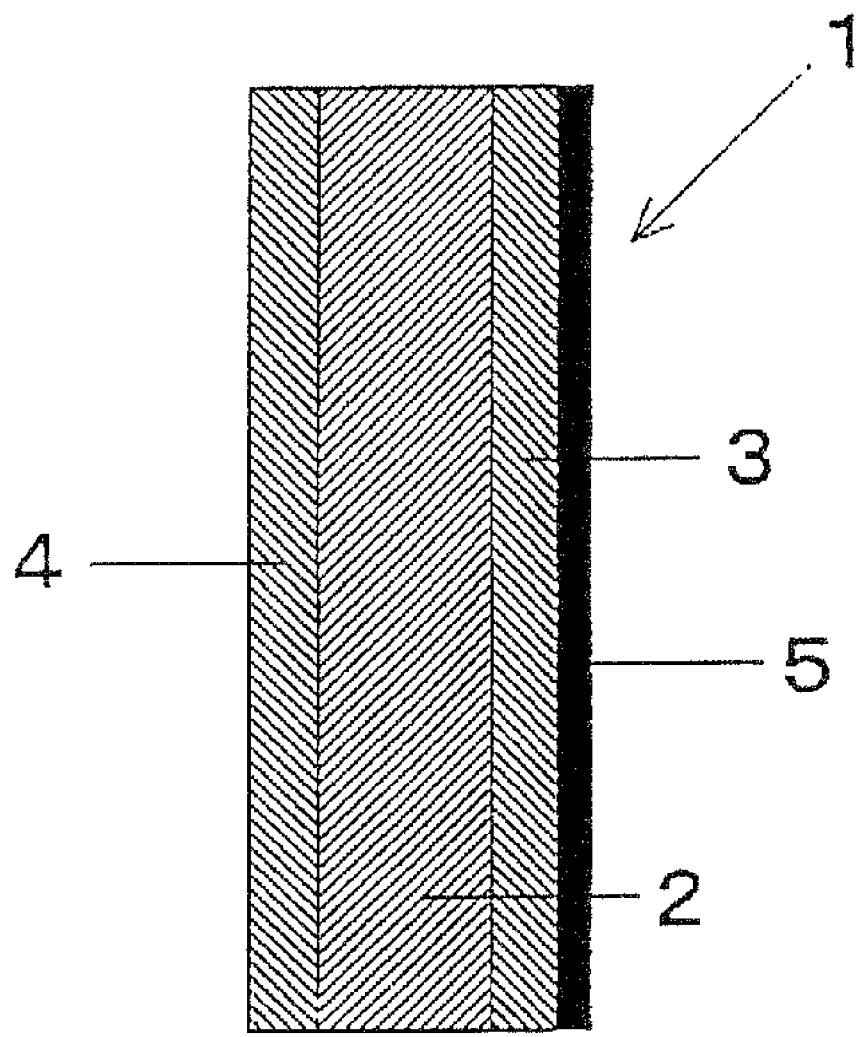
FIG. 3 is a schematic cross-sectional view of another resin-coated metal sheet used in the present invention.

In FIG. 3 which shows another example of the cross-sectional structure of the resin-coated metal sheet, it is preferable to form the inner surface layer 5 on the polyester resin layer 3 which constitutes the can inner surface side.

For example, it is preferable that the inner surface layer is formed of polyester or copolyester induced from a terephthalic acid component or an isophthalic component which exhibits a little absorbing property for a flavor component in the content and a lower layer is formed of copolyester having a large copolymer quantity such as isophthalic acid which exhibits the excellent adhesiveness to the metal substrate.

The resin-coated metal sheet 1 served for the present invention can be produced by extruding and coating the polyester resin layer 3 in the molten state onto the metal substrate 2 and thereafter thermally adhering the polyester resin layer 3 to the metal substrate 2.

Further, as another manufacturing method, the resin-coated metal sheet 1 served for the present invention can be produced by thermally adhering a non-stretched film (cast film) made of polyester resin which is preliminarily formed into a film to the metal substrate 2.

The thickness of the polyester resin layer 3 which is served for the present invention preferably falls in a range of 2 to 60 μm, and more particularly in a range of 3 to 40 μm as a whole from a viewpoint of the protective effect of metal and the workability.

Further, an adhesive agent or a primer for adhesion may be used when necessary.

[Metal Substrate]

As a metal substrate, various kinds of surface treatment steel sheet or a light metal sheet made of aluminum or the like can be used.

As the surface treatment steel sheet, it is possible to use a sheet which is obtained by making a cold rolled steel sheet subjected to a secondary cold rolling after annealing and performing one, two or more kinds of surface treatments selected from a group consisting of zinc plating, tin plating, nickel plating, nickel-tin plating, electrolytic chromic-acid treatment, chromic acid treatment and the like.

As a preferred example of the surface treatment steel sheet, an electrolytic chromic acid treatment sheet is named. It is particularly preferable to use the electrolytic chromic acid treatment sheet which includes a metal chromium layer of 10 to 200 mg/m$^2$ and a chromium oxide layer of 1 to 50 mg/m$^2$ (metal conversion) This electrolytic chromic acid treatment sheet exhibits the excellent adhesive property with respect to the resin film, the coating or the like and also exhibits the excellent corrosion resistance.

Another preferred example of the surface treatment steel sheet is a hard tin sheet having a tin plating amount of 0.5 to 11.2 g/m$^2$. It is preferable that an upper layer of the tin sheet is subjected to the chromic acid treatment or the chromic acid/phosphating treatment such that the chromium amount becomes 1 to 30 mg/m$^2$ in metal chromium conversion.

Still another preferred example of the surface treatment steel sheet is an aluminum coated steel sheet to which aluminum plating or the aluminum pressure bonding is applied.

As the light metal sheet, an aluminum sheet or an aluminum alloy sheet can be used. The aluminum alloy sheet which exhibits the excellent corrosion resistance and workability has the composition consisting of 0.2 to 1.5 weight % of Mn, 0.8 to 5 weight % of Mg, 0.25 to 0.3 weight % of Zn, 0.15 to 0.25 weight % of Cu and Al as the balance.

It is preferable that upper layers of these light metal sheets are also subjected to the chromic acid treatment or the chromic acid/phosphating treatment in which a chromium amount is 20 to 300 mg/m$^2$ in metal chromium conversion. The surface treatment applied to the light metal sheet can be performed by using water-soluble phenol resin together.

Although the thickness of an element sheet of the metal substrate may differ depending on the kind of metal and the use or the size of a seamless can, the element sheet having the thickness of 0.10 to 0.50 mm is preferably used. Particularly, with respect to the surface treatment steel sheet, it is preferable to set the thickness to 0.10 to 0.30 mm, while with respect to the light metal sheet, it is preferable to set the thickness to 0.15 to 0.40 mm.

EXAMPLES

The present invention is further explained in detail in conjunction with following examples. Table 1 shows the compositions of resin used in respective examples and FIG. 2 shows conditions and evaluations of respective examples.

Example 1

Polyester resin having the composition C shown in Table 1 was charged into a biaxial extruder, was extruded through T dies to form films having a thickness of 20 µm. The films were cooled by cooling rollers and the cooled film were wound to form cast films. Thereafter, the films formed in the above manner were thermally laminated to both surfaces of an aluminum alloy sheet (sheet thickness: 0.28 mm, A3004 material, chromic acid/phosphate surface treatment). The lamination was immediately followed by water cooling thus obtaining a polyester resin-coated metal sheet. The temperature of the metal sheet before the lamination was set to a temperature 15 degree centigrade higher than a melting point of polyester resin and the lamination was performed by setting a temperature of lamination rolls to 150 degree centigrade and at a sheet travelling speed of 40 m/min thus producing the resin-coated metal sheet.

The polyester resin-coated metal sheet produced in this manner was coated with a wax-type lubricant and a disc having a diameter of 152 mm was blanked to obtain a shallow drawn cup. Then, by making the shallow drawn cup subjected to ironing working, a seamless cup was obtained.

Followings were properties of the seamless cup.
cup diameter: 66 mm
cup height: 127 mm
thickness of can wall portion with respect to element sheet: 45%

This seamless cup was subjected to doming forming in accordance with a normal method. After performing the heat treatment of polyester resin at a temperature of (Tm−10) degree centigrade for three minutes, the seamless cup was cooled in atmosphere. Thereafter, post workings such as trimming working of an end peripheral portion of an opening, curved surface printing, baking, drying, neck-in working, flange working and the like were performed thus producing a seamless can having a capacity of 350 cc.

Example 2

A seamless can was produced by a method similar to the method of the example 1 except for that this embodiment used polyester resin having the composition D shown in FIG. 1.

Example 3

A seamless can was produced by a method similar to the method of the example 1 except for following conditions. That is, in this embodiment, polyester resin having the composition B shown in Table 1 which constitutes a surface layer and the polyester resin having the composition D shown in Table 1 which constitutes a lower layer were charged into two biaxial extruder and were extruded through a two-layer T-die thus forming a two-layered cast film, wherein a thickness of the surface layer was 5 µm and a thickness of the lower layer was 15 µm. Thereafter, a laminated material was obtained by using the cast film.

Example 4

A seamless can was obtained by a method similar to the method of the example 3 except for that polyester resin having the composition A shown in Table 1 constitutes the surface layer and polyester resin having the composition C shown in Table 1 constitutes the lower layer.

Example 5

The lamination similar to that of the example 3 was performed except for following conditions. That is, in this embodiment, cast films each of which is comprised of a surface layer made of polyester resin having the composition D shown in Table 1 and the lower layer made of polyester resin having the composition E shown in Table 1 were laminated to both surfaces of a TFS steel sheet (sheet thickness: 0.18 mm, metal chromium quantity: 120 mg/m$^2$, chromium hydration oxide quantity: 15 mg/m$^2$).

The polyester resin-coated metal sheet produced in this manner was coated with a wax-type lubricant and a disc having a diameter of 166 mm was blanked to obtain a shallow drawn cup. Then, by making the shallow drawn cup subjected to thinning drawing working based on elongation, a seamless cup was obtained.

Followings were properties of the seamless cup.
cup diameter: 66 mm
cup height: 128 mm
thickness of can wall portion with respect to element sheet: 65%

This seamless cup was formed into a seamless can using a method similar to that of the example 1.

Example 6

Polyester resin having the composition F shown in Table 1 was simultaneously extruded from an extruder having a diameter of φ65 mm and coated onto both inner and outer surfaces of an aluminum alloy sheet (sheet thickness 0.28 mm, A3004 material, chroming/phosphating surface treatment) which was heated to 250 degree centigrade such that inner-side and outer-side films respectively have a thickness of 20 μm. Thereafter, the cooling was performed to produce a polyester resin-coated metal sheet.

Using the resin-coated metal sheet produced in this manner, a seamless can was produced by a method similar to that of the example 1.

Example 7

A seamless can was produced in a manner similar to that of the example 6 except for that this example used polyester resin having the composition G shown in Table 1.

Example 8

A seamless can was produced by a method similar to the method of the example 6 except for following conditions. That is, in this example, polyester resin having the composition A shown in Table 1 which constitutes a surface layer and the polyester resin having the composition F shown in Table 1 which constitutes a lower layer were simultaneously extruded and coated onto the aluminum alloy sheet through a biaxial extruder and a two-layer T-die thus forming a two-layered cast film, wherein a thickness of the surface layer was 5 μm and a thickness of the lower layer was 15 μm.

Example 9

A seamless can was obtained by a method similar to the method of the example 8 except for that polyester resin having the composition D shown in Table 1 constitutes the surface layer and polyester resin having the composition C shown in Table 1 constitutes the lower layer.

Comparison Example 1

A seamless can was obtained by a method similar to the method of the example 1 except for that this comparison example 1 used polyester resin having the composition A shown in Table 2 and the heat treatment shown in Table 1 was applied.

Comparison Example 2

A seamless can was obtained by a method similar to the method of the example 1 except for that polyester resin having the composition B shown in Table 1 constitutes the surface layer and polyester resin having the composition D shown in Table 1 constitutes the lower layer, and the heat treatment shown in Table 2 was applied.

Comparison Example 3

A resin-coated metal sheet was produced by a method similar to that of example 1 except for following conditions. That is, in this embodiment, a cast film using polyester resin having the composition A shown in Table 1 was laminated to a TFS steel sheet (sheet thickness: 0.18 mm, metal chromium quantity 120 mg/m$^2$>chromium hydration oxide quantity: 15 mg/m$^2$).

By making this resin-coated metal sheet subjected to the thinning drawing working/ironing working similar to that of the example 5 and the heat treatment shown in Table 2, the resin-coated metal sheet is formed into a seamless cup.

Subsequently, a seamless can was produced by making the seamless cup subjected to the post workings in the same manner as the example 1.

Comparison Example 4

A seamless can was obtained by a method similar to the method of the comparison example 3 except for that this comparison example 4 used polyester resin having the composition F shown in Table 1 and the heat treatment of the seamless cup was not performed.

Comparison Example 5

A seamless can was obtained by a method similar to the method of the comparison example 3 except for that polyester resin having the composition E shown in Table 1 constitutes the surface layer and polyester resin having the composition B shown in Table 1 constitutes the lower layer, and the heat treatment of the seamless cup was not performed.

Comparison Example 6

A seamless can was obtained by a method similar to the method of the example 1 except for following conditions. That is, in this comparison example, after forming a cast film using polyester resin having the composition A shown in Table 1, the cast film was stretched three times respectively in the longitudinal direction as well as in the lateral direction at 100 degree centigrade. Thereafter, the cast film was subjected to the heat treatment for five seconds at 230 degree centigrade thus producing a biaxially stretched film and, then, the biaxially stretched film was subjected to the heat treatment shown in Table 2.

Comparison Example 7

A seamless can was obtained by a method similar to the method of the example 6 except for that this comparison example 1 used polyester resin having the composition B shown in Table 1 and the heat treatment shown in Table 2 was applied.

Comparison Example 8

A seamless can was produced by a method similar to the method of the example 6 except for following conditions. That is, in this comparison example, polyester resin having the composition E shown in Table 1 which constitutes a surface layer and the polyester resin having the composition D shown in Table 1 which constitutes a lower layer were simultaneously extruded and coated through a biaxial extruder and a two-layer T-die to form a two-layered film and the two-layered film was subjected to the heat treatment shown in Table 2.

The resin-coated seamless cans which were produced in the above-mentioned examples and comparison examples were evaluated using following methods.

[Measurement of Density]

A portion of the seamless can disposed at a can height of 70 to 90 mm is cut out as a sample having a square shape of 20 mm in the direction intersecting the rolling direction of the sheet material of the seamless can by 90°. Metal was dissolved by hydrochloric acid of 6N so as to isolate the inner film. Thereafter, the sample was dried under vacuum at least for 24 hours and then the density of the sample was measured at a temperature of 20 degree centigrade by a sink and float method using a density gradient tube. The measurement was performed after 1 hour elapsed from a point of time that the sample was charged into the density gradient tube.

The result of the measurement is shown in Table 2.
[Evaluation of Adhesion]

A cross cut was formed on an inner film on a can barrel upper portion of the seamless can, a cellophane tape (product of Nichiban Ltd, width: 24 mm) was laminated, and the cellophane tape was peeled off. The evaluation was performed by observing with naked eyes the peeled-off state of the polyester resin coating after peeling off the cellophane tape.

The result of the evaluation is indicated by following symbols in Table 2.

◯: no film peeling-off occurred.

x: film peeling off occurred.

[Cross Cut Evaluation]

A sample having a square shape of 3 cm×3 cm was cut out from an inner surface of the can barrel upper portion of the seamless can. After forming a cross cut on the sample using a cutter, the sample was immersed into a 0.1% sodium chloride aqueous solution. After holding this condition at a temperature of 50 degree centigrade for a week, the corrosion state was observed.

The evaluation was performed in accordance with the size of film peeling-off from the cross-cut portion and the size of corrosion under film.

The result of evaluation was indicated in Table 2 by following symbols.

◯: The film peeling-off or the corrosion under film of less than 1 mm was observed.

x: The film peeling-off or the corrosion under film of equal to or more than 1 mm was observed.

[Pack Evaluation]

After placing a can filled with Coca-Cola in a horizontal posture, at a temperature of 5 degree centigrade, a weight of 1 kg which has a spherical surface of a diameter of 65.5 mm was dropped from a position which is 40 mm high above a can-bottom-side terminal point of a neck-in worked portion of a can disposed on a can axis which is perpendicular to the rolling direction of a metal sheet such that the spherical surface hits and applies an impact to the can-bottom-side terminal point. Thereafter, the can was subjected to a storing test at a temperature of 37 degree centigrade so that the state of the inner surface of the can after the lapse of one year was evaluated.

Further, the weight is dropped in an erected form from a position 50 cm above the can-bottom-side terminal point. Thereafter, the can was subjected to a storing test at a temperature of 37 degree centigrade so that the state of the inner surface of the can after the lapse of one year was evaluated. Particularly, the corrosion of the can neck portion and the can bottom portion was observed and the result of the evaluation is shown in Table 2.

[Retort Treatment Evaluation]

After filling the distilled water of 95 degree centigrade into a can, the can was subjected to the retort treatment at a temperature of 135 degree centigrade for 30 minutes. Then, after the temperature of the can was returned to room temperature, the distilled water is removed from the can and the corrosion state of the inner surface of the can was observed. The result of the observation was shown in Table 2.

[Dichroic Ratio Measurement]

A sample was cut out from a portion of a can barrel portion of a seamless can positioned 70 mm above a can bottom portion of the seamless can and a free film of an inner surface resin layer was isolated by dissolving metal. Then, the sample was subjected to drying under vacuum for at least 24 hours. Thereafter, the infrared absorption spectrums which are polarized in the directions perpendicular to and parallel to the can height direction of the isolated film were measured. Based on the chart of the obtained perpendicular and parallel infrared absorption spectrums, the respective absorbances $Iw(\perp)$ and $Iw(\parallel)$ at 973 cm$^{-1}$ were obtained, and then the infrared dichroic ratio R1 of the polyester resin layer at inner surface side of the can barrel portion was calculated by a following formula (1).

$$R1 = Iw(\perp)/Iw(\parallel) \quad (1)$$

In the same manner, a sample was cut out from the can bottom portion and a free film of an inner surface resin layer was isolated by dissolving metal and was dried. Thereafter, the infrared absorption spectrums which are polarized in the directions perpendicular to or parallel to the metal substrate rolling direction at the can bottom portion were measured. Based on the chart of the obtained perpendicular and parallel infrared absorption spectrums, the respective absorbances $IB(\perp)$ and $IB(\parallel)$ at 973 cm$^{-1}$ were obtained, and then the infrared dichroic ratio R2 of the polyester resin layer at inner surface side of the can bottom portion was calculated by a following equation.

$$R2 = IB(\perp)/IB(\parallel) \quad (2)$$

The result of calculations is arranged in Table 2.

[Crystallization]

A portion of the can barrel upper portion of the seamless can was cut out and a free film was isolated by dissolving metal. Then, the free film was subjected to drying under vacuum at least for 24 hours. Thereafter, the density of the sample was measured and the degree of the crystallization of a resin film was calculated by a density method and the calculated result was indicated.

As has been described heretofore, in the resin-coated seamless can according to the present invention, by performing the control such that the density of the polyester resin layer of the can inner surface side becomes equal to or more than 1.36 or by performing the control such that the infrared dichroic ratio (R1) of the polyester resin layer of the inner surface of the can barrel portion becomes equal to or more than 1.1, it is possible to produce the resin-coated seamless can having the excellent corrosion resistance, the excellent shock resistance and the excellent flavor resistance.

TABLE 1

| | Specification of resin | |
|---|---|---|
| composition | polyester resin | IV(dl/g) |
| A | polyethylene terephthalate | 0.8 |
| B | isophtal-5mol-copolymer-polyethylene-terephthalate | 0.9 |
| C | isophtal-10mol-copolymer-polyethylene-terephthalate | 0.8 |
| D | isophtal-15mol-copolymer-polyethylene-terephthalate | 1.2 |
| E | isophtal-25mol-copolymer-polyethylene-terephthalate | 0.9 |
| F | isophtal-10mol-copolymer-polyethylene-terephthalate/polybutylene-terephthalate = 50/50 (weight ratio) blend | PET/IA 0.8 PBT 0.75 |
| G | isophtal-10mol-copolymer-polyethylene-terephthalate/ionomer* = 50/50 (weight ratio) blend | PET/IA 0.8 |

*Mitsui-Dupont-Polychemical Ltd. HIMILAN#1557

TABLE 2

| | type of resin | type of metal sheet | type of resin film | heat treatment condition | Density upper part of can barrel portion | Density can bottom portion | dichroic ratio barrel portion (R1) | dichroic ratio bottom portion (R2) | degree of crystallization (%) | Adhesiveness | cross cut evaluation corrosion | pack evaluation corrosion of neck portion | pack evaluation bottom portion of can | retort evaluation corrosion |
|---|---|---|---|---|---|---|---|---|---|---|---|---|---|---|
| Example 1 | C | AL | casting | 215° C., 2 minutes | 1.383 | 1.341 | 2.2 | 1.1 | 42 | ○ | ○ | no corrosion | no corrosion | no corrosion |
| Example 2 | D | AL | casting | 190° C., 3 minutes | 1.362 | 1.345 | 1.3 | 1.0 | 24 | ○ | ○ | no corrosion | no corrosion | no corrosion |
| Example 3 | surface layer B | AL | casting | 205° C., 2 minutes | 1.385 | 1.343 | 2.7 | 0.9 | 35 | ○ | ○ | no corrosion | no corrosion | no corrosion |
| Example 4 | lower layer D surface layer A | AL | casting | 220° C., 2 minutes | 1.390 | 1.339 | 3.1 | 1.1 | 48 | ○ | ○ | no corrosion | no corrosion | no corrosion |
| Example 5 | lower layer C surface layer D | TFS | casting | 120° C., 5 minutes | 1.362 | 1.337 | 1.7 | 1.0 | 22 | ○ | ○ | no corrosion | no corrosion | no corrosion |
| Example 6 | lower layer E | AL | simultaneous extrusion | 200° C., 3 minutes | 1.364 | 1.338 | 1.6 | 1.0 | 26 | ○ | ○ | no corrosion | no corrosion | no corrosion |
| Example 7 | F | AL | simultaneous extrusion | 200° C., 3 minutes | 1.367 | 1.341 | 1.8 | 1.0 | 28 | ○ | ○ | no corrosion | no corrosion | no corrosion |
| Example 8 | G surface layer A | AL | simultaneous extrusion | 130° C., 5 minutes | 1.369 | 1.340 | 2.5 | 1.0 | 30 | ○ | ○ | no corrosion | no corrosion | no corrosion |
| Example 9 | lower layer E surface layer D | AL | simultaneous extrusion | 220° C., 3 minutes | 1.371 | 1.338 | 2.1 | 1.0 | 32 | ○ | ○ | no corrosion | no corrosion | no corrosion |
| Comparison Example 1 | lower layer C surface layer A | AL | casting | 160° C., 10 minutes | 1.400 | 1.371 | 3.0 | 1.0 | 56 | × | × | corrosion large | corrosion large | corrosion large |
| Comparison Example 2 | surface layer B lower layer D | AL | casting | 240° C., 2 minutes | 1.356 | 1.337 | 1.0 | 1.0 | 19 | ○ | ○ | corrosion large | no corrosion | corrosion large |
| Comparison Example 3 | A | TFS | casting | 265° C., 5 minutes | 1.348 | 1.338 | 0.9 | 1.0 | 12 | × | × | corrosion large | corrosion large | corrosion large |
| Comparison Example 4 | F | TFS | casting | No heat treatment | 1.352 | 1.338 | 0.8 | 1.0 | 15 | × | × | corrosion large | no corrosion | corrosion large |
| Comparison Example 5 | surface layer E lower layer B | TFS | casting | 245° C., 5 minutes | 1.355 | 1.339 | 0.8 | 1.0 | 18 | × | × | corrosion large | corrosion large | corrosion large |
| Comparison Example 6 | A | AL | biaxial stretching | 150° C., 10 minutes | 1.403 | 1.368 | 3.1 | 1.0 | 59 | × | × | corrosion large | corrosion large | corrosion large |
| Comparison Example 7 | B | AL | simultaneous extrusion | 150° C., 10 minutes | 1.394 | 1.367 | 2.9 | 1.1 | 51 | × | × | corrosion large | no corrosion | corrosion large |
| Comparison Example 8 | surface layer E lower layer D | AL | simultaneous extrusion | 205° C., 2 minutes | 1.358 | 1.338 | 0.9 | 1.0 | 23 | ○ | ○ | no corrosion | corrosion large | corrosion large |

What is claimed is:

1. A seamless can, comprising seamless walls consisting of a can bottom connected to a seamless can barrel having an upper can barrel portion at the upper portion of said can barrel and a lower can barrel portion below said upper can barrel portion, said walls of the can being formed of a metal sheet having a layer of resin on the side thereof that is on the inside of the can, wherein said resin layer comprises a surface layer (A) formed of polyethylene terephthalate/isophthalate containing less than or equal to 15 mol % of isophthalic acid, and a lower layer (B) formed of polyethylene terephthalate/isophthalate containing 8 to 25 mol % of isophthalic acid, wherein the wall thickness at said can barrel is 20-85% of the wall thickness of the can bottom, wherein the resin layer has a density of greater than or equal to 1.36 g/cm$^3$ at the upper can barrel portion and a density of less than or equal to 1.36 g/cm$^3$ at the can bottom, with the density of the resin layer at the upper can barrel portion being greater than the density of the resin layer at the can bottom, and wherein the resin layer of the can barrel comprises molecules that are oriented at least in a uniaxial direction, while the resin layer of the can bottom comprises molecules that are not oriented.

2. The can according to claim 1, wherein the wall thickness at said can barrel is 40 to 80% of the thickness of said can bottom.

3. The can according to claim 1, wherein the orientation of the molecules of the resin layer on the can barrel is in the direction of the height of the can.

4. The seamless can in accordance with claim 1, wherein the resin layer at the inner surface side of the can barrel has an infrared dichroic ratio (R1) of greater than or equal to 1.1, wherein R1 is expressed by formula (1):

$$R1 = Iw(\perp)/Iw(\|) \quad (1)$$

Iw($\perp$) being the infrared absorption intensity at 973 cm$^{-1}$ with respect to polarized infrared rays perpendicular to the can height direction at the can barrel, and Iw($\|$) being the infrared absorption intensity at 973 cm$^{-1}$ with respect to polarized infrared rays parallel to the can height direction at the can barrel;

wherein the resin layer at the inner surface side of the can bottom has an infrared dichroic ratio (R2) of less than or equal to 1.1, wherein R2 is expressed by formula (2):

$$R2 = IB(\perp)/IB(\|) \quad (2)$$

IB($\perp$) being the infrared absorption intensity at 973 cm$^{-1}$ with respect to polarized infrared rays perpendicular to the metal substrate rolling direction at the can bottom, and IB($\|$) being the infrared absorption intensity at 973 cm$^{-1}$ with respect to polarized infrared rays parallel to the metal substrate rolling direction at the can bottom, and wherein R1 is greater than R2.

* * * * *